Figure 1:
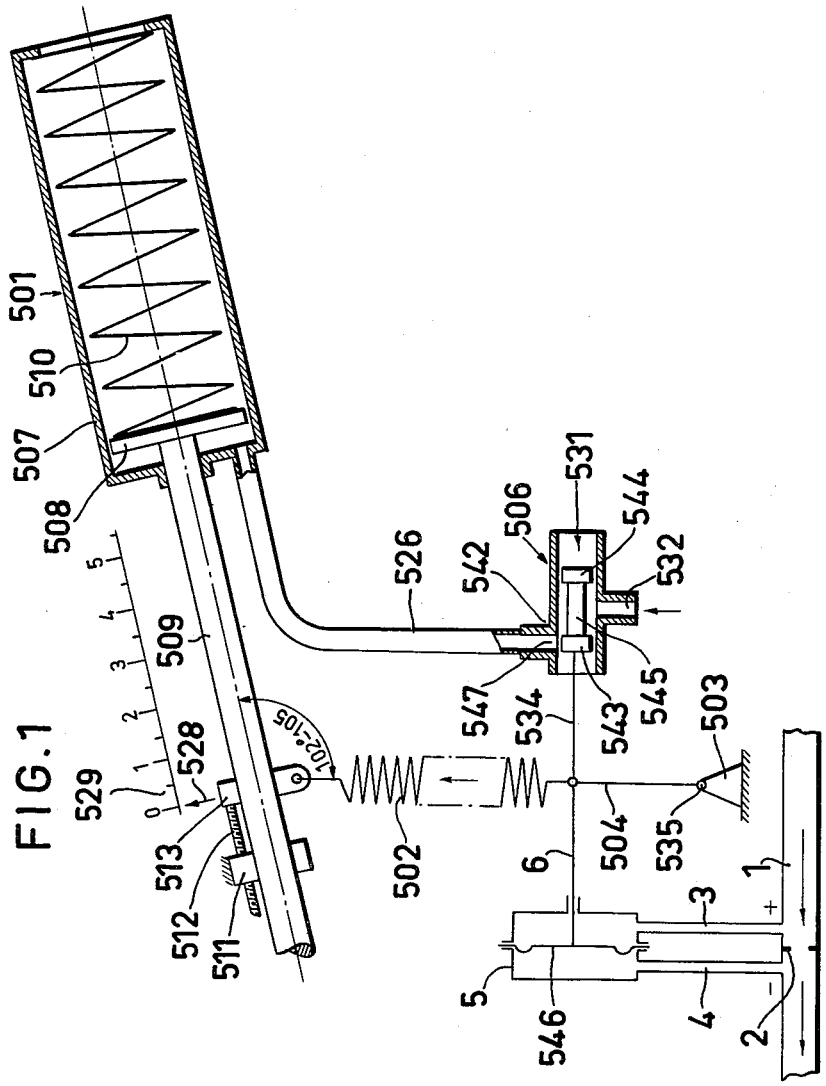

$\sqrt{35.6} = 5.96$
$\sqrt{18} = 4.24$
$\sqrt{3.1} = 1.76$

United States Patent Office 3,006,190
Patented Oct. 31, 1961

3,006,190
MEASURING APPARATUS FOR EFFECTING A COUNTERFORCE TO ANOTHER SQUARELY VARYING FORCE
John Jansson, Stockholm, Sweden, assignor to AB A. Ekstroms Maskinaffar, Stockholm, Sweden
Filed Apr. 22, 1957, Ser. No. 654,095
Claims priority, application Sweden Apr. 27, 1956
3 Claims. (Cl. 73—205)

A common method for measuring the quantity of a liquid or gas which per unit of time flows through a conduit, is to provide an orifice means in said conduit, and to measure the pressure difference arising on both sides of the orifice plate when the medium flows through the conduit, the pressure difference being an indirect measure of the quantity per unit of time. The pressure difference varies, as is known, with the square of the quantity (the speed).

The pressure difference may, of course, be measured in several ways. A conventional way is to allow the pressure on both sides of the orifice means to actuate each side of a diaphragm, whereby a force directed against the diaphragm is produced which likewise is an indirect measure of the quantity flowing through the conduit. This force then varies with the square of the quantity and, in order to obtain a measured value, one measures the force acting on the diaphragm by counteracting the same by e.g. a dynamometer (spring balance).

According to what has been mentioned above, the deflection of the dynamometer will be in square relationship to the quantity flowing through the conduit in such a manner that the greater the quantity flowing through the conduit, the greater is the deflection obtained. If it is desired to have a scale which directly indicates the quantity flowing through the conduit instead of graduating the dynamometer in pounds (force), said scale will have a square graduation.

However, instead of such a scale it is desirable to have a scale with uniform graduation. Other devices must then be resorted to. For instance, a spring may be provided which is stretched by means of a suitably designed cam plate, the movement of which is indicated on a uniformly graduated scale.

Another way is to use the device according to the Swedish Patent No. 88,114 which is based on the principle that a spring with constant tension is turned along a circular arc so that one end of the spring is pivoted to a lever and the other end is moved along a circular arc. The spring will then load the lever under different angles of engagement, the moment arm of the lever changing its length according to the sine of the angle. Since a sine curve from zero up to about 40° fairly well follows a parabola which is the exact curve for a square ratio, an acceptable result can be obtained with this device. Cf. page 2, column 1, last paragraph, in said patent.

The object of the present invention is likewise to obtain an approximate result by one end of the spring being pivoted to a lever and the other end being displaceable along a straight line so that when the angle of engagement of the spring is changed, the tension of the spring is also changed.

Figure 3:
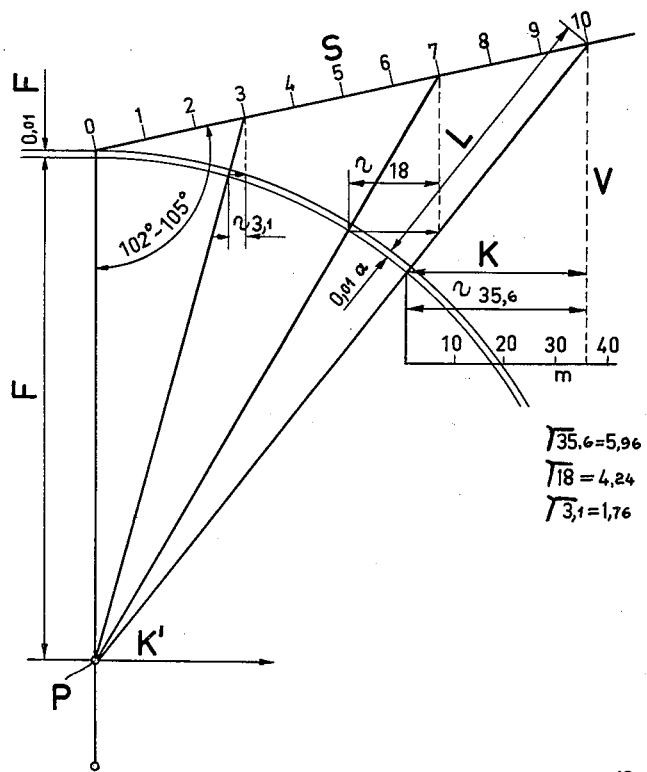
Figure 4:
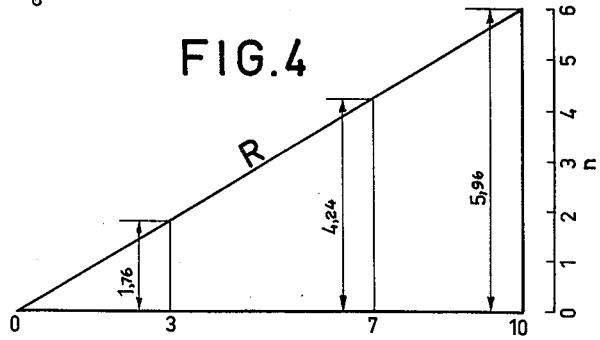

It being, however, difficult to mathematically prove the correctness of an approximately acting device, the action of the measuring transformer is graphically illustrated in FIGS. 3 and 4. F represents the length of the spring in unstressed condition. P is the pivotable bearing point on the lever 504. S is the straight line including the scale along which the other end point of the spring is to be displaced. In order to obtain the best result, S should have an angle in relation to the starting position of the spring, said angle lying between 102° and 105°, and the spring shall be prestressed corresponding to an elongation of the spring by 0.5% to 2% of the unstressed length of the spring. In the figure there are shown four spring positions, viz. those corresponding to the scale values 0, 3, 7 and 10. Let us assume that the spring is in the position 10 in which, in addition to the bias 0.01 F, there has been imparted to the spring an elongation L. As the tension of a spring within moderate limits is directly proportional to the elongation, the distance $0.01F+L$ may in this position be regarded as the force which, in the position in question, is produced by the spring at the point P. This force can be divided into the components K and V, only the component K is shown in FIG. 3 as K' extending from the point P which produces a moment on the lever 504. According to the scale $m$ component $K \cong 35.6$. The component K for the position 7 is $\cong 18$ and the component for the position $3 \cong 3.1$. In order to show that these values have the character of a square ratio with respect to the linear scale S, the square root of the values for K have been inserted in the diagram in FIG. 4 according to the scale $n$, from which it will be seen that all values shown will coincide with the straight line R of the diagram.

Figure 2:
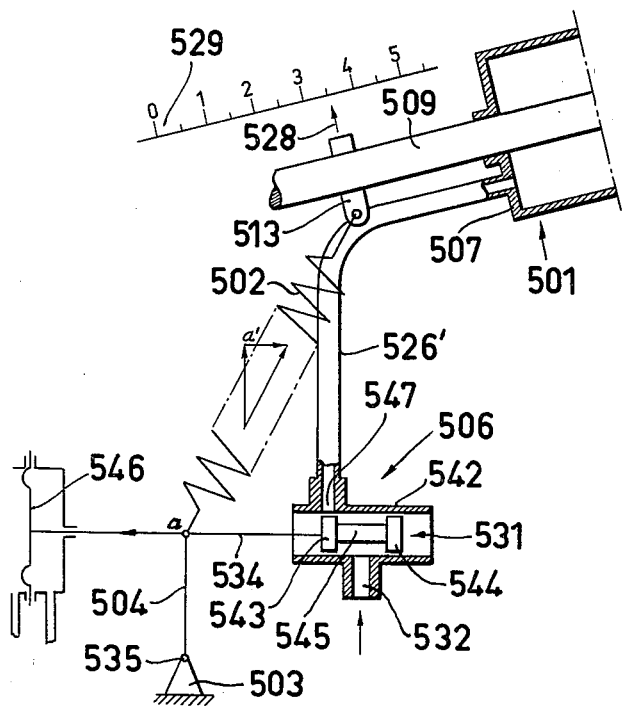

The invention will be described in detail below with reference to the accompanying drawings, in which FIG. 1 is a measuring transformer, according to one embodiment of the invention in a non-operating position, and FIG. 2 is a part of the same measuring transformer in measuring position.

FIG. 3 discloses the theoretical function of the device, and

FIG. 4 shows, in a diagram, the linear curve for the four different measured values marked in FIG. 3, i.e. 0, 3, 7 and 10.

A practical embodiment of the invention is disclosed in FIG. 1. FIG. 2 shows the device in measuring position. The device comprises a diaphragm 546 which is, by means of conduits, connected to both sides of an orificed plate positioned in a conduit. The diaphragm is linked to a lever 504. Said lever 504 is pivoted by means of a pin 535 to a bearing attachment 503. A slide 531 in a valve means 506 is connected by a link 534 to the lever 504. The slide has a narrower intermediate portion 545 and on both sides thereof pistons 543 and 544. Furthermore, the valve means 506 comprises a slide casing 542 having a pressure air inlet channel 532 and a pressure air outlet channel 547. The device further comprises a single-acting servomotor 501 with cylinder 507, piston 508, piston rod 509, compression spring 510, piston-rod guide 511 with stop screw 512. On the piston rod 509 there is provided a spring attachment 513 carrying a pointer 528 for a scale 529 which is positioned parallel to the piston rod 509. A tension spring 502 is pivoted at one end to the lever 504 and at its other end to the spring attachment 513. A conduit 526' extends from the pressure air outlet channel 547 to the end of the cylinder 507, the piston 508 causing a compression of the spring 510 upon supply of air pressure to the cylinder. The servomotor is positioned in such a manner that the piston rod 509 forms an angle of 102° to 105° to the lever 504 and the spring 502 lying in the extension of the lever 504 when the pointer 528 points to zero on the scale 529, and the spring 502 is in this position prestressed corresponding to an elongation of 0.5% to 2% of the free length of the spring between the fixed points (ends). The apparatus should be adjusted in such a manner that when the angle between the piston rod 509 and the lever 504 has the correct value (102°–105°) and the diaphragm 546 is not actuated by any force, the pointer 528 shall point to zero on the scale 529, the spring attachment 513 shall rest on the stop screw 512 and the piston 543 cover the pressure air outlet 547.

*Mode of operation*

If a medium (fluid) begins to flow through the conduit provided with an orificed plate as shown at the bottom of FIG. 1, the diaphragm, which is connected to both sides of the plate by conduits, is, due to the pressure difference, actuated by a force which is directed to the left in the figure. This force imparts to the diaphragm a movement to the left whereby the slide 531, through the intermediary of the link 534, moves to the left so that the channel 547 is exposed. Air under pressure from a pressure source, not shown, flows through the valve means and the conduit 526′ into the cylinder 507. Due to the air pressure the piston 508 with the rod 509 will move to the right and compress the spring 510. As a consequence of this movement the upper bearing point of the spring 502 will be displaced upward and to the right, the tension of the spring being increased and an angle being formed between the lever and the central axis of the spring as shown in FIG. 2. A spring force component $a'$ will then counteract the force $a$ of the diaphragm and the movement of the piston rod continues to the right until balance is obtained between the two forces, the abovementioned movement of the slide 531 to the left being replaced by a movement to the right so that the channel 547 is covered and the supply of pressure air to the cylinder ceases and the piston stops. According to what has been earlier mentioned, the deflection of the pointer 528 on the scale 529 is an indirect measure in linear scale of the flow through the shown conduit with orifice means. Should the flow diminish, the force acting on the diaphragm decreases, the spring force displaces the slide to the right in the figure, air is blown out from the cylinder to the left of the piston 543, the spring 510 presses the piston 508 with the rod 509 to the left until balance of the forces has been reached again, and the channel 547 is covered.

What I claim is:

1. In a measuring device for a linearly variable quantity in which a force is produced which varies as the square of the quantity, means for providing a linear indication of the quantity by measurement of the force comprising, a member movable by the force, a lever bearing at one end against said member and pivotally connected at its other end to a fixed point, a cylinder spaced from the pivoted end of the lever, a piston within the cylinder, a piston rod connected to the piston and extending from the cylinder, a tension spring connecting the piston rod and the one end of the lever and prestressed by an amount which is between 0.5% and 2% of the distance between the ends of the spring when in its unstressed condition, said cylinder lying at an angle of between 102–105° to the lever when the latter is in a position of equilibrium, means controlled by movement of the member in one direction upon application of the force thereto for moving the piston in the opposite direction to tension the spring for applying a counterforce on the member to return it and the lever to the piston of equilibrium, and a linear scale for indicating the movement of the piston rod.

2. In a measuring device according to claim 1, in which the member is linearly movable toward the one end of the lever.

3. A device in accordance with claim 1 in which a spring is mounted within the cylinder to counteract displacement of the piston in the said opposite direction.

References Cited in the file of this patent

UNITED STATES PATENTS

| | | |
|---|---|---|
| 1,298,630 | Schmidt | Mar. 25, 1919 |
| 1,638,101 | Roucka | Aug. 9, 1927 |
| 1,968,539 | Rydberg | July 31, 1934 |
| 2,360,751 | Ziebolz | Oct. 17, 1944 |
| 2,655,037 | Gess | Oct. 13, 1953 |
| 2,716,888 | Svenson | Sept. 6, 1955 |

FOREIGN PATENTS

| | | |
|---|---|---|
| 605,194 | Great Britain | June 19, 1948 |